April 26, 1932.  G. G. SCHWABEK  1,855,320
PARACHUTE
Filed July 1, 1929  2 Sheets-Sheet 2
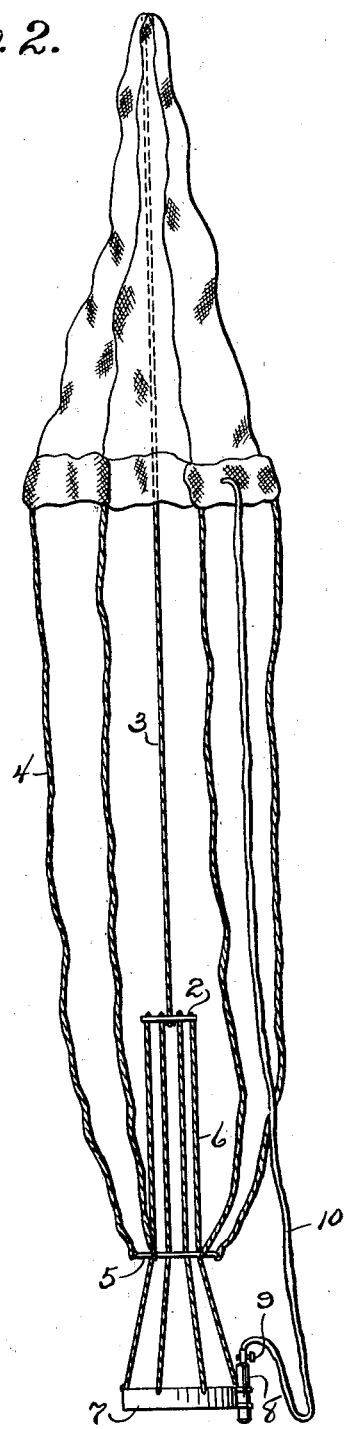
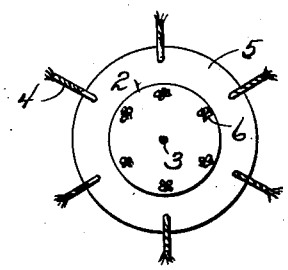
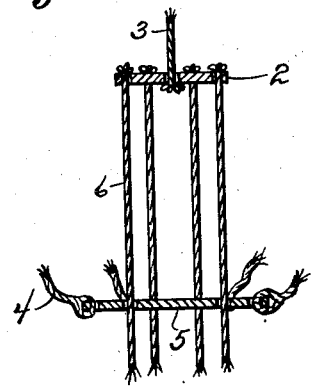
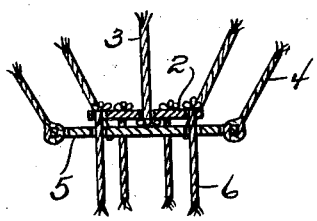
George G. Schwabek
INVENTOR
BY Victor J. Evans
ATTORNEY Patented Apr. 26, 1932

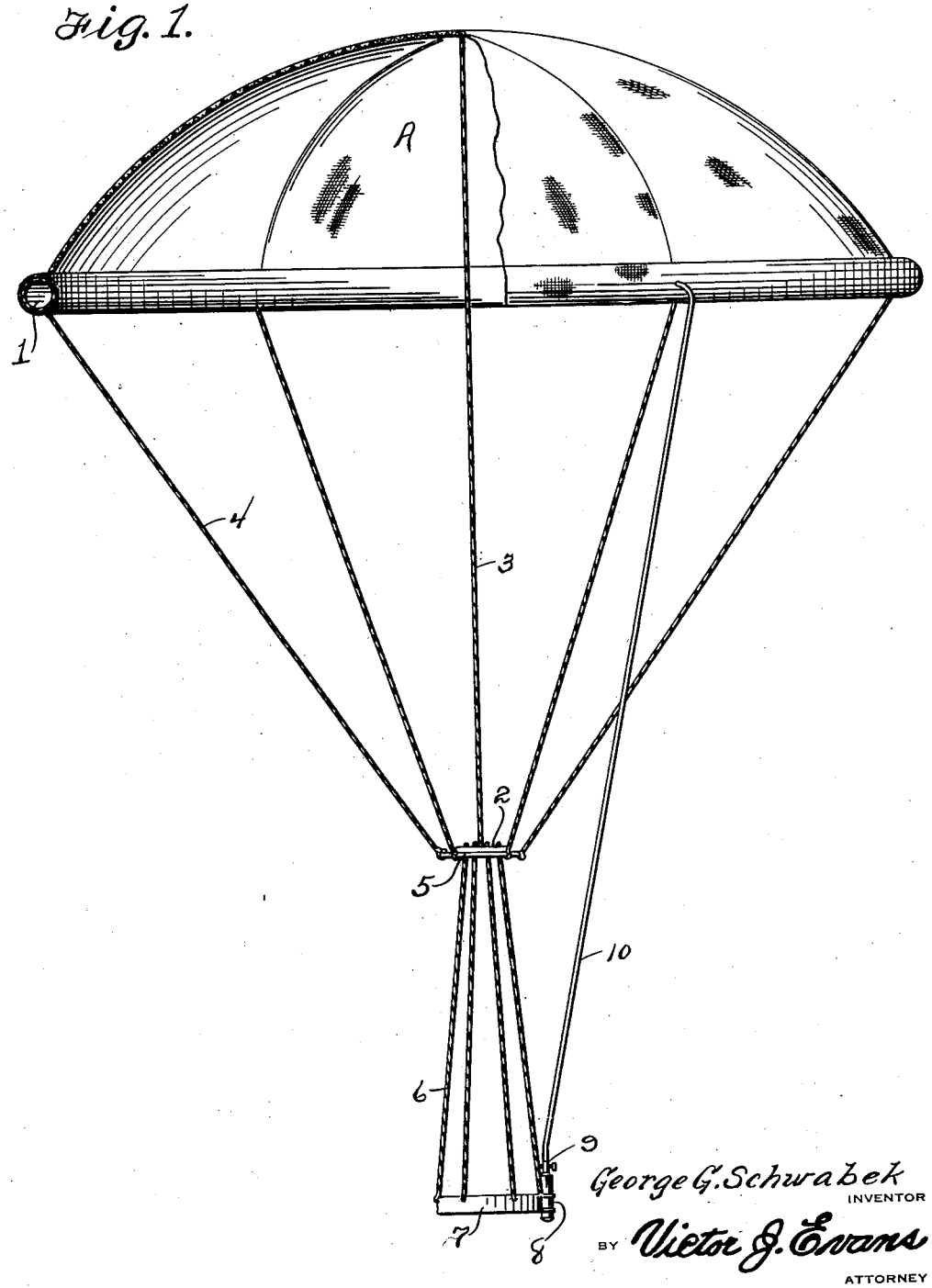

1,855,320

UNITED STATES PATENT OFFICE

GEORGE G. SCHWABEK, OF BALTIMORE, MARYLAND, ASSIGNOR TO THE NEVERFALE PARACHUTE CORPORATION, OF BALTIMORE, MARYLAND, A CORPORATION OF MARYLAND

PARACHUTE

Application filed July 1, 1929. Serial No. 375,219.

This invention pertains to parachutes in general but particularly, to a parachute which may be carried by an aviator for use in emergency or for exhibition jumps.

One of the primary objects of the invention is to provide an arrangement whereby the canopy will not assume any substantial portion of the load between its edges and center until after it has "caught the air" and opened, the initial effect of the load being to force the edges of the canopy quickly apart for the air to enter.

Another object is to provide a parachute construction in which the shroud lines and the lines immediately attached to the load are so arranged that entanglement of the lines with one another is prevented.

Another object of the invention is to provide a pneumatic member or ring which may be applied at the edge of the parachute canopy and inflated so as to assist in opening up the canopy and holding it in open position until the canopy has filled out. In this connection means are provided whereby a gas may be introduced into the inflatable member.

Another object of the invention is to provide a tank containing compressed air or the like which is attached to the harness and is connected with the pneumatic member by a tube so that by opening a valve, air will pass from the tank into the member to inflate the same.

Many further objects as well as the advantages, uses and purposes of the invention will be or should become clearly apparent after reading the following description and claims and after viewing the drawings. As some of the features of my invention are adjunctive only and may be dispensed with in practice, I do not desire to be limited thereto except in those claims calling for such adjunctive features.

In describing the invention in detail, reference will be had to the accompanying drawings wherein like characters denote like or corresponding parts throughout the several views, and in which:—

Figure 1 is an elevation, with parts broken away, showing a parachute constructed in accordance with this invention.

Figure 2 is an elevation of the improved parachute, showing the same collapsed.

Figure 3 is a top plan view of the two disks.

Figure 4 is a sectional view showing the disks separated.

Figure 5 is a similar view showing the disks together.

In these views, the letter A indicates the parachute and the numeral 1 indicates a pneumatic ring suitably attached to the edge of the parachute. The edge of the parachute may be formed with a casing to receive this ring. A top disk or plate 2 is connected to the center of the parachute by a cable 3 and cables 4 connect the edges of the parachute with a lower plate or disk 5 which is of larger diameter than the disk 2. Cables 6 connect the upper disk 2 with the harness 7 and these cables 6 pass through perforations formed in the lower disk 5. As shown, the cables 3 and 4 are of such lengths that when the parachute is collapsed, the cable 3 will be taut and the cables 4 will be slack and these cables 4 will permit the lower disk 5 to slide down the cables 6 if the cable 3 is carrying the weight of the upper disk 2 and the harness. This position of the parts is shown in Figure 1. As soon as the pneumatic member is inflated, however, its expansion will cause the parachute to open out so that the cables 4 are pulled upon and the disk 5 will slide up the cables 6 until it strikes the disk 2 so that the parts will assume a position as shown in Figure 2.

A tank 8, containing compressed air or the like, is fastened to the harness 7 and has a valve 9 in its outlet, this outlet being connected by a tube 10 with the pneumatic member, so that by opening the valve, the compressed fluid in the tank will pass into the member 1 and thus inflate the same.

From the foregoing it will be seen that it is simply necessary for the person to which the harness is attached to open the valve 9 to permit the air from the tank to enter the pneumatic member to cause said member to open up the parachute. Thus the parachute is positively opened and its opening action is not dependent on the parachute being opened by the air. When the parachute is collapsed, the strain of the two disks and the harness is taken by the cable 3, but as soon as the parachute opens, the strain is taken by the cables 4.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A parachute having an inflatable ring attached to its edge, a cable having one end attached to the center of the parachute, a top disk connected with the other end of the cable, a perforated disk, cables connecting the same with the edges of the parachute, cables connected with the top disk and passing through the perforations in the other disk, a harness connected with the last mentioned cables, a tank of compressed fluid connected with the harness, a tube connecting the tank with the inflatable ring and a valve in the outlet of the tank.

2. A parachute having a cable with one end attached to the center of the parachute, a top disk connected with the other end of the cable, a perforated disk, cables connecting the same with the edges of the parachute, cables connected with the top disk and passing through the perforations in the other disk and a harness connected with the last mentioned cables.

3. A parachute having a cable with one end directly attached to the center of the parachute, a member connected with the lower end of the cable, a second member, cables connecting the second member with the edges of the parachute, a harness and a cable connecting the harness with the first member and on which the second member slides.

4. In a parachute, a canopy, a plurality of shroud lines, secured to and depending from spaced places adjacent the edge of said canopy, a flexible member secured to a center portion of said canopy and depending therefrom between said shroud lines, a stop member secured to said shroud lines and holding said shroud lines in relatively fixed spaced relation to one another, a second stop member secured to said flexible member, said stop members being interengageable to limit upward movement of said shroud lines relative to said flexible member beyond a predetermined distance, a plurality of flexible elements secured to and depending from said flexible member in spaced relation to one another for supporting a load and means for guiding said elements past said shroud lines and the stop secured to said shroud lines.

5. In a parachute, a canopy, a plurality of shroud lines secured to and depending from spaced places adjacent the edge of said canopy, a flexible member secured to a center portion of said canopy and depending therefrom between said shroud lines, a stop member secured to said shroud lines and holding said shroud lines in relatively fixed spaced relation to one another, a second stop member secured to said flexible member, said stop members being interengageable to limit upward movement of said shroud lines relative to said flexible member beyond a predetermined distance, and means including a plurality of flexible elements secured to said flexible member and guided and spaced in predetermined positions by the first said stop member for supporting a load.

In testimony whereof I affix my signature.

GEORGE G. SCHWABEK.